UNITED STATES PATENT OFFICE 2,130,533

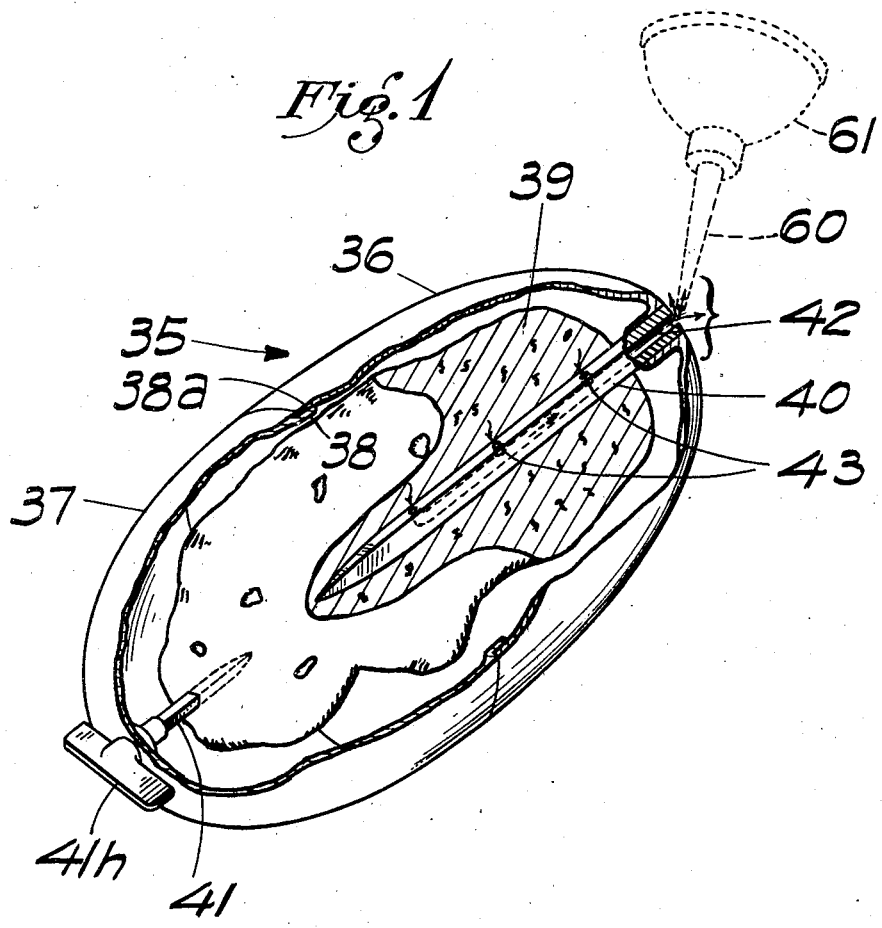

METHOD OF AND MEANS FOR BAKING

Raymond L. Barton, Los Angeles, Calif.

Original application January 19, 1935, Serial No. 2,461. Divided and this application January 29, 1937, Serial No. 123,038

6 Claims. (Cl. 53—6)

This invention pertains to a baking or roasting utensil, and principally to a method of baking carried out in conjunction therewith.

This application is a division of my co-pending application, Serial Number 2,461 filed January 19, 1935 and carries forward important objects set forth therein.

In addition to some of the more important objects set forth in said application, A further object is to provide a device wherein a moist edible may be mounted on a supporting means and retained in spaced relation to the inside walls, the supporting means having an exterior vent for demoisturizing the edible per se or venting the area around the edible thru the edible upon the latter reaching a certain stage of doneness.

A still further object of the invention is to point contactedly support an edible in spaced relation to the wall of a container whereby as the article is being cooked in submerged heat or an open fire its watery vapor given off during cooking protects from burning as might otherwise be the case if the article contacted the heated walls of the container. Simultaneously the hot vapor bath aids in the cooking of the article.

In the drawing forming a part of the specification—

The figure is a perspective view showing the invention in a preferred form, wall portions thereof being broken away to show interior parts.

Referring in detail to the drawing, the invention is embodied in an oven casing 35 which is elliptical as viewed in longitudinal mid-section. This casing is formed in two slightly telescoping sections 36 and 37, having a shouldered lip 38 and a plain lip 38a. Said lips are machined out of round so that when once telescoped, a clockwise or counterclockwise rotation of one with respect to the other will clinch them together in a substantially air-tight relation. This form of invention is adapted for baking large potatoes one at a time although it will be obvious a number of small potatoes also may be baked similarly, and other shapes employed.

A potato 39 is shown supported in spaced relation to the walls of the oven by means of a large penetrating spur member 40 at one end, and a smaller spur 41 at the other end. Owing to the spur 40 being pointed at one end and having a body portion which can puncture the potato without breaking it, the spur may be easily projected into or through potatoes preparatory to placing them in a position for baking. The spur 40 has a longitudinally extending vent passage 42 and lateral vents 43. The vents may, should occasion arise, provide egress for excess pressure built up in the area surrounding the potato, thru the potato, when it is cooked to a porous or floury state. The vents also aid in demoisturizing the edible being cooked.

Olive oil, melted butter, or other desired liquid dressing may be introduced into the potato thru the lateral vents 43 from the open end of the vent 42 by means of the spout 60 of a conventional can 61, thus seasoning the edibles while baking. The spout 60 of the can should be small enough to provide for the insertion of its discharge end within the open end of the spur so that liquid dressing may be forcibly fed into the interior of the edibles. This may be done if the can is of the type having its bottom made of resilient springy sheet metal or the device may be placed on end and the seasoning substance permitted to gravitate slowly into the potato by permeation.

The exterior portion of the small spur 41 is round to permit it to turn in the bearing provided therefor by that end portion of the casing, but the portion thereof which penetrates the potato is pointed and polygonal in cross section. Said spur 41 has a handle 41h which the cook may grasp and thus test the extent to which the cooking has progressed. If the spur 41 turns easily it indicates that the potato has been softened considerably by the action of the heat thereon, but if the spur resists torsional force it indicates that the potato has not yet become well cooked.

In practice the section 36 is supported by one hand while the potato is centralized and fed onto the spur 40 by the other hand. Section 37 is then applied to section 36 and given a slight twist when the utensil is ready to be introduced to heat. This heat may be in the character of an oven, an open gas flame or the coal beds of a burning camp fire or other heat producing medium, the choice depending somewhat on the material with which the device is constructed. Owing to the fact that the sections engage each other with a working fit the area surrounding the potato is virtually made air-tight.

As heat is applied to the casing the edible gives off moisture in the form of steam which envelops the potato and fills up the area therearound. This steam increases in pressure as the potato cooks, envelops it and in addition to aiding in cooking the potato with its own vapor also prevents the outer surface of the potato from becoming blistered from the heat. This manner of permeating the potato with its own watery substance enhances the palatability of the potato and also retains properties so vital to human health which are otherwise given off when the potato is subjected to heat in a large oven.

The pressure built up in the area around about the potato will, when it gets too great, vent itself thru the pores of the potato, especially when it gets to a semi-floury state, to the outside thru the prong. This lessening of pressure thru the interstices of the potato in turn spreads the molecules of the potato and aids in flaking of the potato when it is ready for eating.

The turnable testing spur 41 may be dispensed with entirely when the cooking of the edible is properly timed.

It should be understood that the present disclosure is for the purpose of illustration only and that this invention includes all modifications and equivalents which fall within the scope of the subject matter claimed.

What is claimed is:

1. The method of cooking an edible which consists in impaling an edible, providing the impaling member with a vent, housing the edible on said member in an enclosure with the sides of the edible in spaced relation to the enclosure with the vent in the member opening and accessible exteriorly of the enclosure upon the latter being in closed condition, subjecting the enclosure to heat and when the structure of the edible becomes softened by heat injecting liquid seasoning thru the vent into the edible while maintaining the enclosure in closed condition.

2. The method of testing the extent to which an article of food being baked has been softened by the application of heat thereto which consists in supporting such food article within a closed casing in a non-turnable manner with relation to said casing, and then projecting into said article a turnable impaling member having a polygonal pointed portion, and then testing the resistance of said impaling member against a turning movement by the application of torsional force thereto.

3. The method of repermeating an edible with its own watery substance given off during cooking which consists in impaling an edible, providing the impaling member with a vent, housing the edible on said member in an enclosure with the sides of the edible in spaced relation to the enclosure with the vent open to the atmosphere, subjecting the enclosure to heat and when the structure of the edible becomes softened by heat aerating the interior of the enclosure to the atmosphere thru the softened structure.

4. That method of cooking an edible containing moisture which consists in subjecting the edible to heat while placing the interior of the edible in communication with air free from the moisture of the edible.

5. That method of cooking an edible containing moisture which consists in supporting the edible in a closed receptacle free from contact with all the walls of the receptacle, and subjecting the receptacle to cooking heat while maintaining the interior of the edible in free communication with the air exterior of the receptacle.

6. That method of cooking an edible containing moisture which consists in supporting the edible in a closed receptacle free from contact with all the walls of the receptacle, subjecting the receptacle to cooking heat while maintaining the interior of the edible in free communication with the air exterior of the receptacle, and supplying seasoning through the communication from the exterior of the receptacle to the interior of the edible.

RAYMOND L. BARTON.